UNITED STATES PATENT OFFICE.

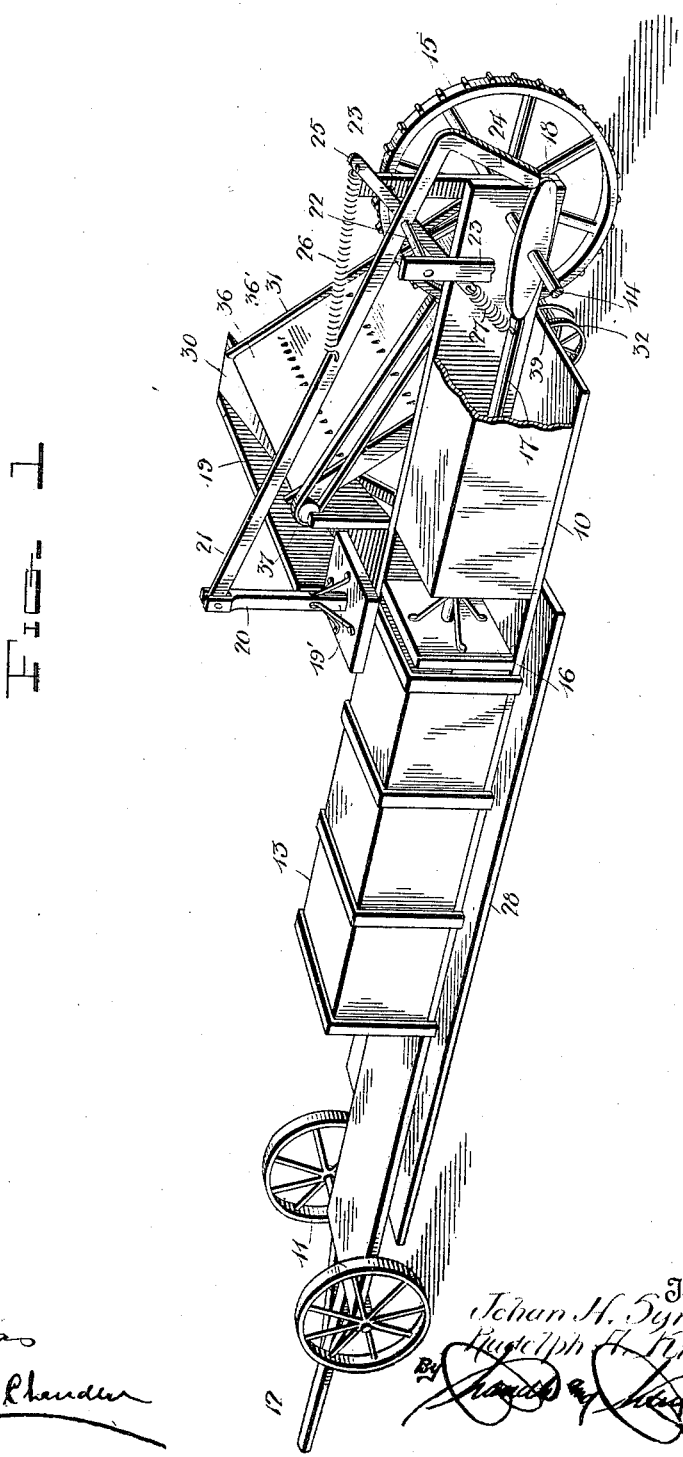

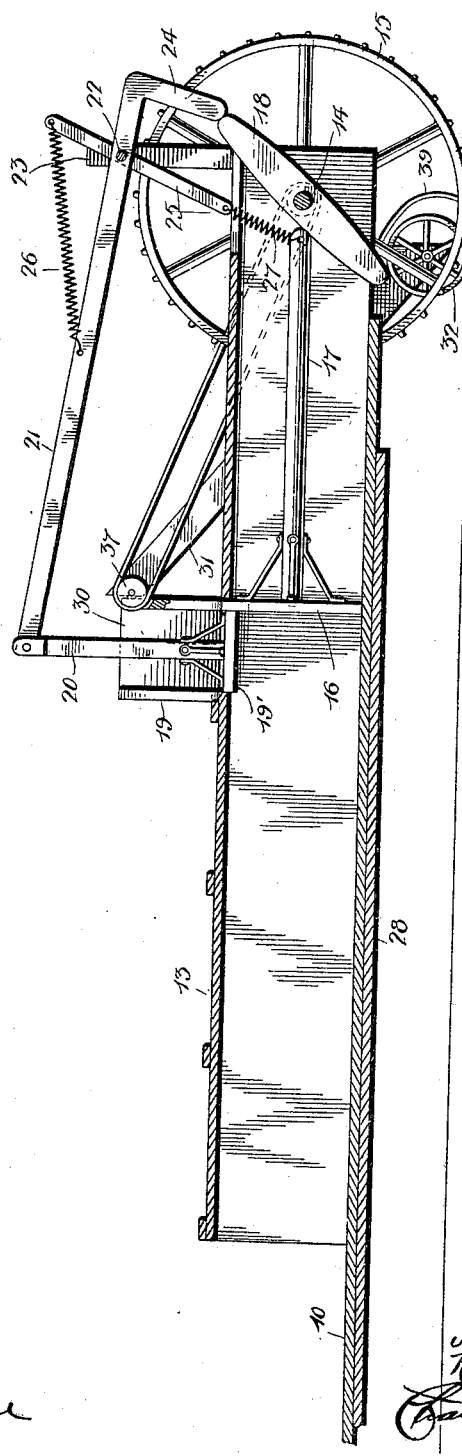

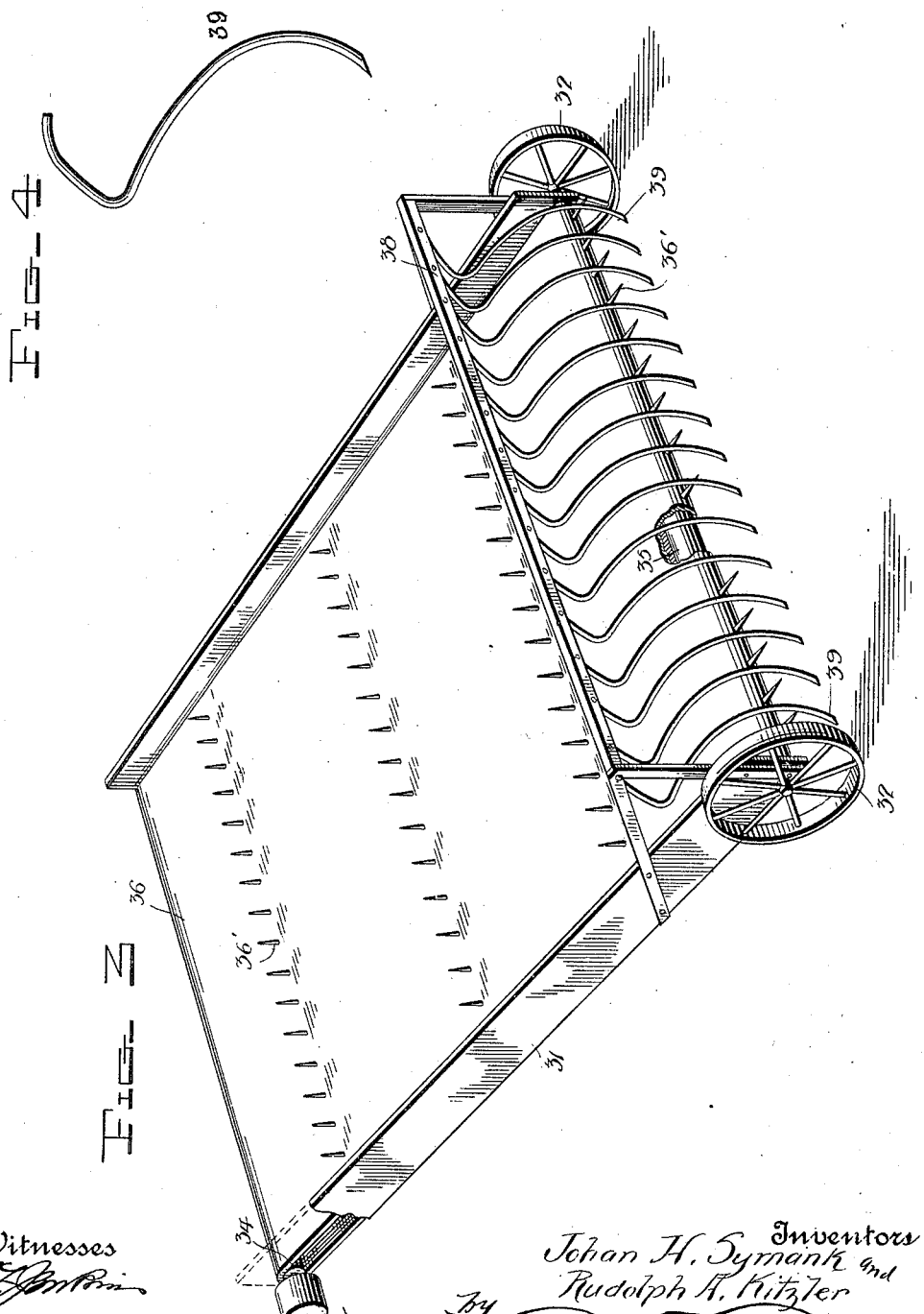

JOHAN H. SYMANK AND RUDOLPH A. KITZLER, OF STAMP, TEXAS.

HAY BALER AND RAKE.

SPECIFICATION forming part of Letters Patent No. 697,692, dated April 15, 1902.

Application filed August 13, 1901. Serial No. 71,963. (No model.)

*To all whom it may concern:*

Be it known that we, JOHAN H. SYMANK and RUDOLPH A. KITZLER, citizens of the United States, residing at Stamp, in the county of Falls, State of Texas, have invented certain new and useful Improvements in Hay Balers and Rakes; and we do hereby declare the following to be a full, clear, and exact description of the invention, such as will enable others skilled in the art to which it appertains to make and use the same.

This invention relates to mechanisms for raking hay and for baling it; and it has for its object to provide a construction including a baling-machine which is mounted upon wheels and having a rake connected therewith and disposed to discharge to the hopper of the baler, so that the hay may be baled as fast as it is raked, thus saving much time and handling.

Further objects and advantages of the invention have reference to the specific mechanisms included in the general structure and which will be understood from the following description.

In the drawings forming a portion of this specification, and in which like numerals of reference indicate similar parts in the several views, Figure 1 is a perspective view showing the machine, the plunger forced inwardly to its limit, and the feeder raised from the path thereof. Fig. 2 is a side elevation of the machine, the plunger retracted, and the feeder lowered to its limit. Fig. 3 is a perspective view of the rake detached. Fig. 4 is a detail elevation showing one of the teeth of the rake.

Referring now to the drawings, the present apparatus comprises a baling-press including a base 10, which at its forward end is mounted upon wheels 11, the axle of which has a tongue 12 to permit of hitching a team to draw the apparatus. On the base are fixed the sides and other portions of the press-box 13, and through the sides, at the rear ends thereof, is passed the rear axle 14, which is rotatably mounted in suitable bearings and is provided with bull-wheels 15, through the medium of which the baler or press is operated. A plunger is provided and consists of the head or piston 16, having the rod 17, which is taken rearwardly through the end portion of the baler, and its rear end is disposed for engagement by a double cam 18, so formed that with each rotation of the axle on which the cam is fixed the end of the rod will be engaged twice to move the plunger forwardly and transversely of the hopper and into the press-box.

The hopper is shown at 19 and is positioned as is usual, so that when the plunger is retracted hay may be passed through the hopper and into position in advance of the plunger, so that when the plunger is advanced the hay will be forced into the box and compressed. After the hay is fed to the hopper it must be pressed through it and into the press-box in advance of the plunger, and to do this automatically a feed-plunger 19' is provided. This plunger 19' or feeder is fixed at the end of a post or rod 20, which is pivoted at its upper end to a lever 21, which is fulcrumed upon a transverse bar or shaft 22, mounted upon the uprights 23 at the rear end of the press or baler. A link 24 is pivoted to the rear end of the lever and depends therefrom with its lower end in the path of the cam on the drive-axle, so that it may be engaged thereby to have its rear end raised and its forward end depressed. It will be noted that the major projections of the cam are diametrically opposite, while the movement of the rear end of the lever is at almost a right angle to the movement of the press-plunger, so that the feeder is not moved to its lowermost point until after the press-plunger has been moved forwardly to its limit and then withdrawn to let the feeder pass in front of it. To withdraw the plunger, a pivoted lever 25 is provided and mounted upon the shaft 22, and has helical springs 26 and 27 attached to its ends, one of which is connected with the feeder-lever and the other with the rod of the press-plunger, so that when the lever is moved to actuate the feed the springs are placed under tension, so that they may draw the press-plunger back. When the press-plunger is moved forwardly, the springs are again placed under tension, with the result that the lever is operated to raise the feeder and permit the press-plunger to operate. Thus as the machine is drawn along the press will be operated and such hay as is fed to the hopper will be baled, it being understood that the usual gates are placed in the press-box and that the bales are tied in the usual manner, a platform 28 being provided at the sides of the machine, on which the attendants may stand.

Leading to the hopper of the press, at one side thereof, is a transverse chute 30, which is slanted downwardly to the hopper, so that hay that is placed in the chute will run freely or may be easily passed to the hopper. To place the hay in the chute, a rake and elevator is provided and consists of a frame 31, which is attached to the side of the chute pivotally, and the lower end thereof is provided with supporting-wheels 32, so that the apparatus may pass easily over uneven ground without racking the parts.

At the upper and lower ends of the frame are journaled rollers 34 and 35, over which is secured a conveyer belt or apron 36, having fingers 36', the upper roller, which has its shaft disposed to form the pintle of the connection between the frame and chute, having a band-wheel 37, which is connected by a belt with the bull-wheel axle, which is provided with a corresponding band-wheel. Thus as the mechanism moves forwardly the fingers at the upper side of the apron will travel in the direction of the chute to discharge thereto.

To facilitate engagement of the fingers with the hay, it is first collected by a rake consisting of a beam 38, which is suitably supported above the wheels of the frame and to which are attached the rake-teeth 39, the upper ends of which are secured to the beam in any suitable manner, and below the beam the teeth are taken downwardly and slightly forwardly and then bent rearwardly and downwardly into arcuate form, so as to lie behind the lowermost portion of the apron. These teeth gather the hay, and the fingers of the apron moving between the teeth engage the hay and elevate it, as above mentioned.

With this construction it will be seen that as the machine is drawn through a field the rake will first gather the hay. It will be then elevated to the chute, down which it will pass to the hopper, and will be fed through it to the press-box, where it will be pressed or baled and discharged. In practice modifications of the specific construction shown may be made and any suitable materials and proportions may be used for the various parts without departing from the spirit of the invention.

What is claimed is—

1. In a combined hay baler and rake, the combination with the press-box and hopper, of a laterally-extending chute leading to the hopper, an elevating apparatus for raising and discharging to the chute, a plunger for the press-box, a rotatable cam disposed for engagement with the plunger to move it forwardly, a pivoted lever, a feeder-plunger carried by the lever for movement to engage and feed hay into the box in advance of the presser-plunger, and having a depending rear end in the path of movement of the cam for engagement thereby to operate the lever and therewith the feeder-plunger, a pivoted lever having springs at its ends connected with the lever and presser-plunger, a bull-wheel, and connections between the bull-wheel and the cam and the elevating apparatus.

2. In a baler, the combination with a press-box and its hopper, of a feeding device for the hopper, a plunger for the press-box, a pivoted lever having springs connected with its ends and with the feeding device and plunger respectively, and means for engagement with the feeding device and plunger alternately to operate them and place the springs under tension to retract the inoperative member.

3. In a baler, the combination with the press-box and plunger of a rotatable cam disposed for engagement with the plunger to move it forwardly, a pivoted lever, a feeder-plunger carried by the lever for movement to engage and feed hay into the box in advance of the presser-plunger, a link pivoted to the opposite end of the lever in the path of movement of the cam for operating the lever and therewith the feeder-plunger, and a pivoted lever having springs at its ends connected with the lever and presser-plunger, for the purpose set forth.

In testimony whereof we affix our signatures in presence of two witnesses.

JOHAN H. SYMANK.
RUDOLPH A. KITZLER.

Witnesses:
L. FLEISCHHAUL,
WM. KITZLER.